US007698793B2

(12) United States Patent
Tsuchiya

(10) Patent No.: US 7,698,793 B2
(45) Date of Patent: Apr. 20, 2010

(54) ELECTRET CONDENSER MICROPHONE AND METHOD OF PRODUCING THE SAME

(75) Inventor: Yuki Tsuchiya, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 23 days.

(21) Appl. No.: 11/789,647

(22) Filed: Apr. 25, 2007

(65) Prior Publication Data

US 2007/0258605 A1 Nov. 8, 2007

(30) Foreign Application Priority Data

Apr. 25, 2006 (JP) ............................ 2006-121301

(51) Int. Cl.

| | |
|---|---|
| ***H01G 7/00*** | (2006.01) |
| ***B23P 17/00*** | (2006.01) |
| ***G11B 5/127*** | (2006.01) |
| ***H01F 3/04*** | (2006.01) |
| ***H01F 7/06*** | (2006.01) |
| ***G01V 1/18*** | (2006.01) |
| ***H04R 17/00*** | (2006.01) |
| ***B32B 27/00*** | (2006.01) |

(52) U.S. Cl. ...................... 29/25.41; 29/417; 29/602.1; 29/609.1; 367/178; 367/180; 428/421

(58) Field of Classification Search .................. 29/594, 29/25.41, 417, 602.1, 609.1, 886; 367/178, 367/180, 174, 191, 396, 398; 428/421
See application file for complete search history.

(56) References Cited

U.S. PATENT DOCUMENTS 5,560,279 A * 10/1996 Connors et al. ............... 92/5 R
5,870,482 A 2/1999 Leoppert et al.
6,677,044 B2 * 1/2004 Araki et al. ................ 428/421
6,898,292 B2 5/2005 Tanabe et al.
6,947,568 B2 * 9/2005 Tanabe et al. .............. 381/174
7,307,350 B2 * 12/2007 Ohashi et al. .............. 257/783
2003/0077454 A1 * 4/2003 Jing .......................... 428/421
2003/0113546 A1 * 6/2003 Cho et al. .................. 428/421
2006/0218785 A1 10/2006 Horiuchi et al.

FOREIGN PATENT DOCUMENTS

JP 2000-32596 A 1/2000
JP 2005-191467 A 6/2005

* cited by examiner

*Primary Examiner*—A. Dexter Tugbang
*Assistant Examiner*—David P Angwin
(74) *Attorney, Agent, or Firm*—Brinks Hofer Gilson & Lione

(57) ABSTRACT

A method of producing an electret condenser microphone capable of reflow mounting includes a first step of providing a backplate substrate having a backplate; a second step of providing an adhesive-backed fluorine-containing resin film formed by stacking an adhesive on a film-shaped fluorine-containing resin material having a surface treated by wet or dry chemical etching; a third step of stacking the adhesive-backed fluorine-containing resin sheet on the backplate of the backplate substrate with the adhesive interposed therebetween; a fourth step of setting the adhesive to firmly secure the fluorine-containing resin material to the backplate of the backplate substrate; and a fifth step of implanting electric charges into the fluorine-containing resin film firmly secured onto the backplate.

10 Claims, 11 Drawing Sheets

ELECTRET CONDENSER MICROPHONE AND METHOD OF PRODUCING THE SAME

This application claims priority under 35 U.S.C. §119 to Japanese Patent Application No. JP2006-121301 filed Apr. 25, 2006, the entire content of which is hereby incorporated by reference.

BACKGROUND OF THE INVENTION

1. Field of the Invention

The present invention relates to an electret condenser microphone having excellent heat resistance and also relates to a method of producing the electret condenser microphone.

2. Description of the Related Art

A conventional electret condenser microphone (hereinafter abbreviated as "ECM") has a diaphragm as a vibrating plate and an electret layer (electrically charged resin layer) that are opposed to each other to constitute a capacitor, which is used as a vibration detecting device.

A method of producing such a conventional ECM is disclosed, for example, in Japanese Patent Application Publication No. 2002-345087. According to this method, an electret layer, which is an electrically charged resin material, is prepared by forming a resin layer on a metallic backplate substrate serving as a detecting electrode, and implanting an electric charge into the resin layer (see FIG. 3 in the above-mentioned publication). Alternatively, a backplate is film-formed on a backplate substrate of a resin or ceramic material, and the above-described electret layer is formed on the backplate (see FIG. 1 in the above-mentioned publication).

When used in household devices and the like, the ECM having the electret layer is, generally, soldered to a motherboard having other electric elements mounted thereon. In order to reduce ECM mounting costs, solder mounting using a reflow oven is demanded. In the solder mounting using a reflow oven, the ECM is subjected to preheating at 160° C. to 180° C. for about 100 seconds, followed by heating at 250° C. for about 10 seconds. Under the high-temperature conditions, the electric charge implanted in the electret layer decreases, with the result that the ECM may become unable to perform its function as a microphone. In other words, the ECM has the problem that the electret layer is inferior in heat resistance.

Some propositions have heretofore been made to solve the above-described problem. For example, Published Japanese Translation of PCT International Publication for Patent Application No. 2001-518246 discloses an ECM that uses an inorganic silicone resin as an electret material in place of an organic resin material which is inferior in heat resistance. Silicone resins, however, are higher in cost than organic resin materials.

Japanese Patent Application Publication No. 2000-32596 discloses an ECM that enables solder mounting using a reflow oven by improving a conventional organic electrically charged resin layer (electret layer). In this ECM, an organic resin material for constituting an electret layer is fusion-bonded to a metal plate constituting a backplate substrate. Then, the metal plate is subjected to high-temperature annealing at about 200° C. for about 1 to 6 hours, followed by electric charge implantation, thereby forming a high heat-resistant electrically charged resin layer.

Japanese Patent Application Publication No. 2005-191467 discloses a method of forming a resin layer for electric charge implantation which is made of a heat-resistant resin material, i.e., polytetrafluoroethylene (hereinafter abbreviated as "PTFE") and comprises two or more layers, by successively fusion-bonding PTFE films onto a metal plate. In this method, in order to improve the inferior adhesion between the metal plate and the PTFE film, the first PTFE film is fusion-bonded to the substrate at a high temperature of 370 to 390° C., and the second PTFE film is fusion-bonded onto the first layer of PTFE at a temperature lower than the fusion-bonding temperature for the first film, i.e. at 330 to 350° C.

In addition, the above-mentioned Patent Application Publication No. 2005-191467 discloses methods of improving the adhesion between the PTFE film and the metal plate. It is stated as one of the methods that an adhesive layer of a thermoplastic resin is provided between the metal plate and the PTFE film. Paragraph [0009] in this publication, however, states that "the provision of the adhesive layer makes it impossible to obtain the desired characteristics of the fixed electrode and degrades the electric charging characteristics". The reason for this may be as follows. If the metal plate is die-cut into a desired electrode shape after a PTFE film has been bonded thereto through a thermoplastic resin adhesive layer, the adhesive layer is strained by the impact force of die-cutting, which exerts an adverse effect on the characteristics of the PTFE film as an electret layer.

In recent years, it has been noted that the above-described PTFE film and other fluorine-containing resin materials are excellent in heat resistance and moisture resistance, and there has been an increasing demand for fluorine-containing resin materials as moisture-proof sealants. Under these circumstances, there is a commercially available adhesive-backed fluorine-containing resin film formed by stacking an adhesive on a fluorine-containing resin material having a surface activated by surface treatment with an alkaline metal amide in liquid ammonia. This adhesive-backed fluorine-containing resin film is used as a tape material under adverse environmental conditions such as high-temperature and high-humidity conditions.

As has been stated above, one technique disclosed in the foregoing related arts features that a sheet of electret material is fixedly secured by fusion bonding to the surface of a metal plate, and the metal plate having the electret material sheet is die-cut by press working to form a backplate in the shape of an electrode. This technique suffers from the following disadvantages.

Because a sheet of electret material is fusion-bonded directly to a metal plate to be formed into an electrode, if there is a large change in temperature after the electric charge implantation process, thermal expansion of the metal plate influences the sheet of electret material so that molecular motion occurs in the electret material, resulting in the implanted electric charge to disappear from the electret material sheet.

In addition, metal cutting process such as press working performed to shape the metal plate causes internal strain in the electret material sheet fixedly secured to the metal plate. This causes the electrically charged condition to become unstable, resulting in a decrease in the electric charge implanted in the electret material sheet.

Japanese Patent Application Publication No. 2002-345087 discloses in FIG. 1 thereof an arrangement in which a backplate is film-formed on a backplate substrate of a resin or ceramic material, and an electret layer is formed on the backplate. There is, however, no specific explanation of a method of film-forming the electret layer.

Regarding the method of minimizing the decrease of the implanted electric charge by increasing the heat resistance of the electret material, the technique disclosed in Japanese Patent Application Publication No. 2000-32596 is basically an annealing technique applied to the resin material. Therefore, the material needs to be allowed to stand for a long period of time under high-temperature conditions. This involves the disadvantage of an increase in the production time and also a problem in terms of the stability of the product due to variations in the time control and temperature control.

The technique disclosed in Japanese Patent Application Publication No. 2005-191467 needs to fusion-bond at least two sheets of electret material onto the upper side of a metal plate at different temperatures. The process of performing a plurality of fusion-bonding steps at different temperatures is inferior in productivity. This technique finally requires machining to cut the metal plate.

Under these circumstances, the present inventor studied to find a method of producing an ECM capable of reflow mounting and excellent in heat resistance without degrading productivity and, as a result, took notice of the above-described commercially available adhesive-backed fluorine-containing resin film surface-treated with an alkaline metal amide in liquid ammonia. That is, the present inventor has found an ECM production method using the adhesive-backed fluorine-containing resin film, which makes the best use of the excellent electric charging characteristics thereof.

SUMMARY OF THE INVENTION

Accordingly, an object of the present invention is to provide an ECM that is easy to manufacture, excellent in heat resistance and capable of coping with the high temperature of the reflow mounting process, which has heretofore been regarded as difficult, and also provide a method of producing the ECM.

The present invention provides a method of producing an electret condenser microphone. The method includes a first step of providing a backplate substrate having a backplate; a second step of providing an adhesive-backed fluorine-containing resin film formed by stacking an adhesive on a film-shaped fluorine-containing resin material having a surface treated by wet or dry chemical etching; a third step of stacking the adhesive-backed fluorine-containing resin film on the backplate of the backplate substrate with the adhesive interposed therebetween; a fourth step of setting the adhesive to firmly secure the fluorine-containing resin film onto the backplate of the backplate substrate; and a fifth step of implanting electric charges into the fluorine-containing resin film firmly secured onto the backplate.

That is, the method of the present invention uses a fluorine-containing resin material, which has high heat resistance. The fluorine-containing resin film has a surface that has been etched. Therefore, the fluorine-containing resin film and the backplate can be surely bonded to each other. Accordingly, even if the electret condenser microphone produced by this method is heat-treated in a reflow oven, the fluorine-containing resin film can be maintained in a stable condition as an electret material. Thus, it is possible to minimize the decrease of electric charge implanted in the fluorine-containing resin film, and the fluorine-containing resin film after the heat treatment can be used effectively as an electret. The method of the present invention facilitates the process of producing such an electret condenser microphone in comparison to conventional production methods.

The fluorine-containing resin material may be one selected among polytetrafluoroethylene, tetrafluoroethylene-hexafluoropropylene copolymer, and tetrafluoroethylene-perfluoroalkyl vinyl ether copolymer.

The second step may include a step of etching the surface of the film-shaped fluorine-containing resin material by wet or dry chemical etching.

The etching may be wet chemical etching in which the film-shaped fluorine-containing resin material is dipped in a solution containing ions of an alkaline metal.

The alkaline metal may be one selected among lithium, sodium, and potassium.

The solution containing ions of an alkaline metal may be a solution containing any one of ammonia, naphthalene, and phenanthrene.

The adhesive may be an organic polymeric adhesive.

Specifically, the adhesive may be an acrylic or silicone adhesive.

The fourth step may include a step of setting the adhesive by heating it at a temperature of from 180° C. to 250° C.

More specifically, the fourth step preferably includes a step of setting the adhesive by heating it at a temperature of from 210° C. to 235° C.

In addition, the present invention provides a method of producing an electret condenser microphone. The method includes a first step of providing a circuit board aggregation having a plurality of circuit boards arrayed in a lattice, and a second step of providing a backplate substrate aggregation having a plurality of backplate substrates arrayed in a lattice in correspondence to the circuit boards of the circuit board aggregation. The backplate substrates each have a backplate and a film-shaped fluorine-containing resin material having a surface treated by chemical etching. The film-shaped fluorine-containing resin material is stacked on the backplate with an adhesive interposed therebetween and firmly secured to the backplate by setting the adhesive. The film-shaped fluorine-containing resin material is electrically charged to form an electret layer. The method further includes a third step of providing a diaphragm unit aggregation having a plurality of diaphragm units arrayed in a lattice in correspondence to the circuit boards of the circuit board aggregation, and a fourth step of successively stacking the circuit board aggregation, the backplate substrate aggregation and the diaphragm unit aggregation to form a stacked microphone aggregation in which a plurality of electret condenser microphones are arrayed in a lattice. The electret condenser microphones each comprise the circuit board, the backplate substrate and the diaphragm unit aligned with each other in the stacking direction. Further, the method includes a fifth step of cutting the stacked microphone aggregation to separate the electret condenser microphones from each other.

This method enables mass-production of the above-described electret condenser microphone.

The fluorine-containing resin material may be one selected from the group consisting of polytetrafluoroethylene, tetrafluoroethylene-hexafluoropropylene copolymer, and tetrafluoroethylene-perfluoroalkyl vinyl ether copolymer.

The second step may include a step of etching the surface of the film-shaped fluorine-containing resin material by wet or dry chemical etching.

The etching may be wet chemical etching in which the film-shaped fluorine-containing resin material is dipped in a solution containing ions of an alkaline metal.

The alkaline metal may be one selected from the group consisting of lithium, sodium, and potassium.

The solution containing ions of an alkaline metal may be a solution containing any one of ammonia, naphthalene, and phenanthrene.

The adhesive may be an organic polymeric adhesive.

Specifically, the adhesive may be an acrylic or silicone adhesive.

The second step may include a step of setting the adhesive by heating it at a temperature of from 180° C. to 250° C.

The second step preferably includes a step of setting the adhesive by heating it at a temperature of from 210° C. to 235° C.

In addition, the present invention provides an electret condenser microphone including a backplate substrate having a backplate; a film-shaped fluorine-containing resin material stacked on the backplate; and an adhesive bonded between the backplate substrate and the film-shaped fluorine-containing resin material and set to firmly secure the backplate substrate and the film-shaped fluorine-containing resin material to each other. The film-shaped fluorine-containing resin material has been electrically charged to form an electret layer.

As will be understood from the above, the electret condenser microphone is excellent in heat resistance and hence capable of keeping the electret layer effective even if it is heat-treated in a reflow oven.

The fluorine-containing resin material may be one selected among polytetrafluoroethylene, tetrafluoroethylene-hexafluoropropylene copolymer, and tetrafluoroethylene-perfluoroalkyl vinyl ether copolymer.

The adhesive is preferably an organic polymeric adhesive. Specifically, the adhesive may be an acrylic or silicone adhesive.

The above and other objects, features and advantages of the present invention will become more apparent from the following description of the preferred embodiments thereof, taken in conjunction with the accompanying drawings.

DESCRIPTION OF PREFERRED EMBODIMENTS

Embodiments of the present invention will be explained below with reference to the accompanying drawings.

Figure 1:
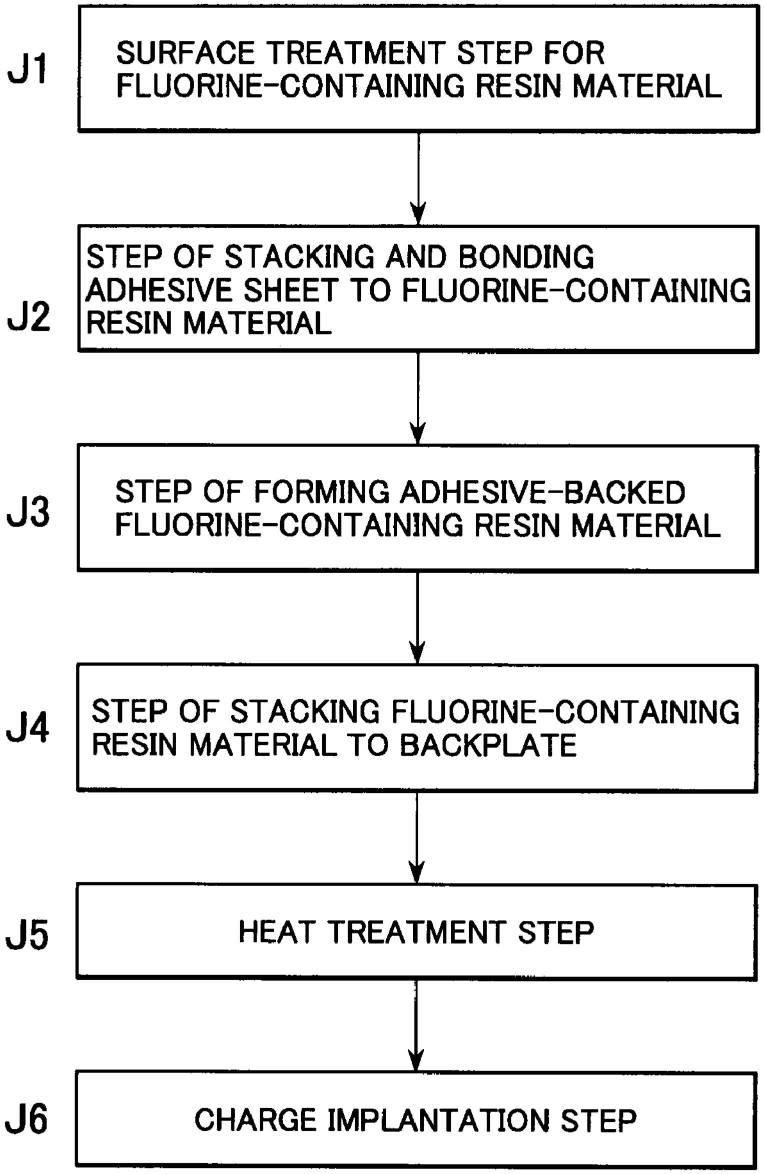
FIG. 1 is a process flow chart showing a method of producing an ECM using a fluorine-containing resin material according to the present invention.

FIG. 1 is a process flow chart showing a basic flow of a method of producing an ECM using a fluorine-containing resin material according to the present invention.

Step J1 is a step of surface-treating a sheet-shaped fluorine-containing resin material. Examples of usable fluorine-containing resin materials are polytetrafluoroethylene (PTFE), tetrafluoroethylene-hexafluoropropylene copolymer (FEP), and tetrafluoroethylene-perfluoroalkyl vinyl ether copolymer (PFA).

At this surface-treatment step, treatment for activating the surface of the fluorine-containing resin material is performed. Specifically, a wet chemical etching method is employed. Examples of wet chemical etching methods usable in this step are as follows.

(1) A Method Using Sodium-Naphthalene Complex:

Sodium (Na) and naphthalene ($C_{10}H_8$) are allowed to react with each other in tetrahydrofuran (THF), and the fluorine-containing resin material is dipped therein for about 15 minutes at room temperature, followed by thorough rinsing with water and drying.

(2) A Method Using Sodium and Liquid Ammonia:

Sodium (Na) is dissolved in liquefied ammonia (ammonia solution), and the fluorine-containing resin material is dipped in this solution for 1 to 5 seconds at room temperature, followed by thorough rinsing with water and drying.

Either of the above-described methods (1) and (2) is effective. The bond strength of the surface-treated PTFE when bonded to a metal or the like with an epoxy resin adhesive is higher with the method (1) than with the method (2). The method (2) is advantageous in that the treatment time is very short, although slightly inferior in bond strength. The methods (1) and (2) may be selectively used appropriately.

It should be noted that it was possible in this example to obtain a fluorine-containing resin material excellent in both adhesiveness (bond strength) and electric charge retaining characteristics by performing surface treatment using an alkaline metal amide synthesized in liquid ammonia.

Step J2 is a step of providing an adhesive-backed fluorine-containing resin sheet having an adhesive sheet stacked and bonded to the fluorine-containing resin sheet surface-treated at the above-described step J1. Examples of preferable adhesives are organic polymeric adhesives. An acrylic or silicone adhesive is particularly preferable.

Step J3 is a step of die-cutting the adhesive-backed fluorine-containing resin sheet prepared at step J2 to the shape of a backplate serving as a detecting electrode of an ECM to be produced by using a sharp-edged punch or the like, thereby providing an adhesive-backed fluorine-containing resin material of the same shape as the backplate.

Step J4 is a step of bonding the adhesive-backed fluorine-containing resin material shaped at step J3 to the backplate of the ECM to be produced.

At step J5, the backplate having the fluorine-containing resin material bonded thereto at step J4 is heated in a heat-treat oven to set the adhesive, thereby firmly securing the fluorine-containing resin material and the backplate to each other. Regarding heat-treatment conditions, when an organic polymeric adhesive is used, the heat treatment is preferably carried out at a temperature of from 180° C. to 250° C., particularly preferably from 210° C. to 235° C.

Step J6 is an electric charge implanting step at which the backplate is set in charge implantation equipment, and an electric charge is implanted into the fluorine-containing resin material, thereby completing a backplate substrate.

A specific example of the backplate substrate production process according to the present invention will be explained below with reference to FIGS. 2 to 4.

Figure 2:
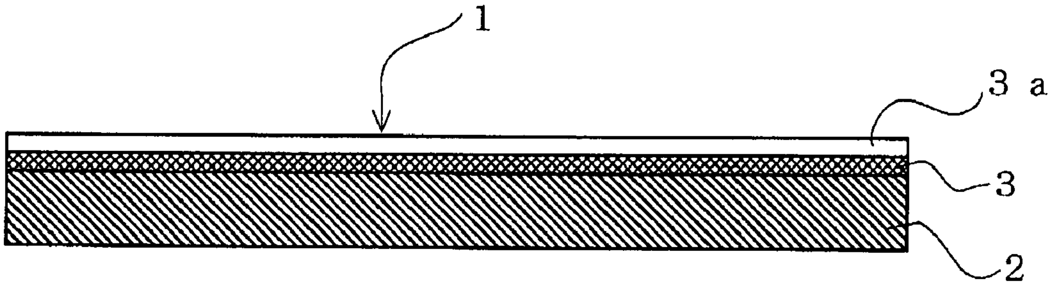
FIG. 2 is a sectional view of an adhesive-backed fluorine-containing resin film used in the present invention.

FIG. 2 is a sectional view of the adhesive-backed fluorine-containing resin material 1 prepared through steps J1 and J2 in FIG. 1. In this example, a PTFE sheet (hereinafter abbreviated as "PTFE") 2 with a thickness of 30 to 80 μm is used as a fluorine-containing resin material. An acrylic adhesive sheet 3 having a thickness of 5 to 10 μm is stacked over the PTFE 2 and covered at a surface thereof with a protective sheet 3*a*.

The PTFE 2 has a surface activated by surface treatment with an alkaline metal amide synthesized in liquid ammonia at step J1 in FIG. 1. The acrylic adhesive sheet 3 covered with the protective sheet 3*a* is stacked on the activated surface of the PTFE 2 to form an adhesive-backed fluorine-containing resin material 1.

Figure 3:
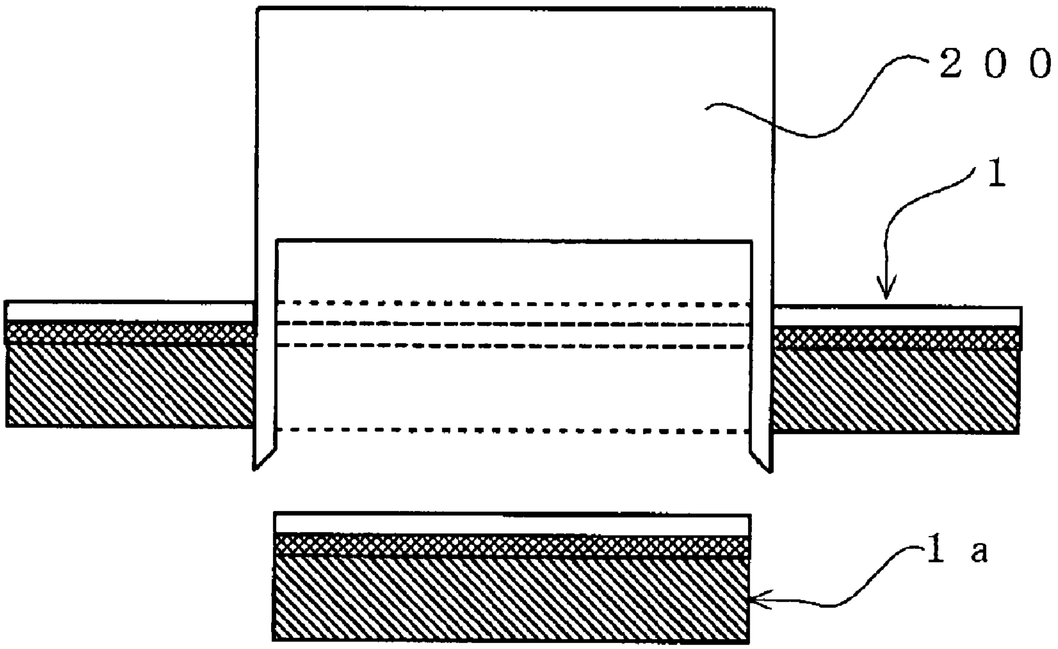
FIG. 3 is a sectional view showing the way in which the adhesive-backed fluorine-containing resin film is die-cut in the present invention.

FIG. 3 shows the forming step J3 in FIG. 1. At this step, the sheet of adhesive-backed fluorine-containing resin material 1 is die-cut with a cutting die 200 having a circular sharp edge conforming to the shape of the backplate (described later), thereby forming a circular adhesive-backed fluorine-containing resin material 1*a*.

Figure 4:
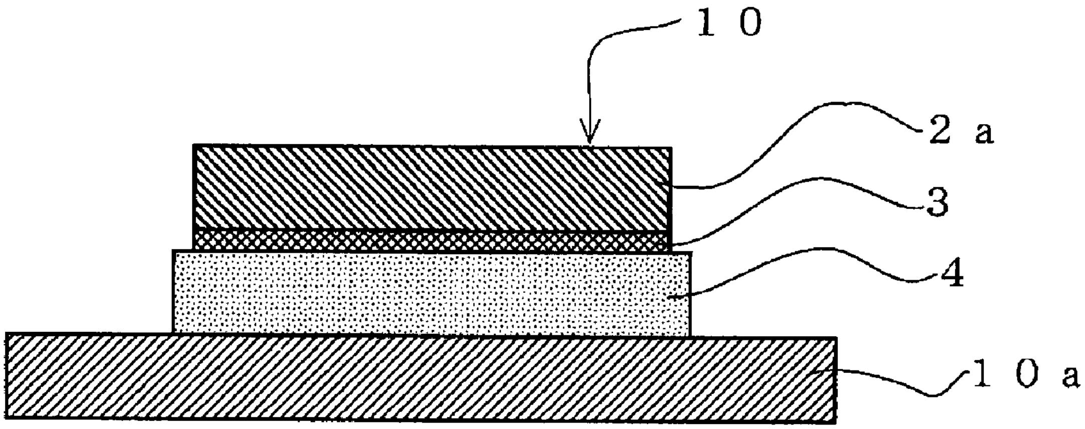
FIG. 4 is a sectional view of a backplate substrate used in the present invention.

FIG. 4 is a sectional view of a backplate substrate 10, which is for explaining steps J4 to J6.

At step J4, the adhesive-backed fluorine-containing resin material 1*a* shaped as stated above, after the protective sheet 3*a* has been removed therefrom, is bonded to the upper side of a backplate 4 formed on an insulating substrate 10*a*, thus forming a backplate substrate 10, shown in FIG. 4, in which the PTFE 2 is bonded to the upper side of the backplate 4 through the adhesive sheet 3. Next, at step J5, the backplate substrate 10 is loaded into a high-temperature oven in which it is heat-treated at a temperature gradually elevated from 210° C. to 235° C., thereby setting the acrylic adhesive sheet 3 to firmly secure the backplate 4 and the PTFE 2 to each other.

Next, at step J6, the backplate substrate 10 is set in charge implantation equipment in which the fluorine-containing resin material is electrically charged to −200V to form an electret layer 2*a*. Thus, the backplate substrate 10 is completed. The backplate substrate 10 has very excellent electric charge retaining characteristics, as will be described below, because the PTFE 2 having a surface activated with an alkaline metal amide synthesized in liquid ammonia is firmly secured to the backplate 4 through the organic adhesive 3.

The reason why the surface charge retaining characteristics are improved is considered as follows. When the adhesive and the PTFE subjected to surface activation treatment are heat-treated in the state of being bonded together, the adhesive sets, and thus the adhesion between the PTFE and the substrate increases. Consequently, the molecular motion of the PTFE is suppressed, and thus the surface charge retaining characteristics are improved. That is, because the molecular motion of the PTFE is suppressed, the static state is maintained, and the energy that causes the surface charge to be released becomes small. Thus, the electric charge retaining characteristics are improved.

Further, it is considered that conjugated double bonds are formed in the PTFE by the surface activation treatment, and because the conjugated double bonds are introduced into the fluorine-containing resin material, they have the function of stabilizing the negative charge as surface charge, and as a result, the electric charge retaining characteristics are improved.

That is, it is considered that in the present invention the negative charge as surface charge is allowed to be present in a very stable energy state, i.e. in a deep quantum well, by a synergistic effect of the suppression of molecular motion by the setting of the adhesive and the stabilization of the negative charge by the conjugated double bonds of the PTFE.

Next, the electric charge retaining effect will be explained.

Figure 5:
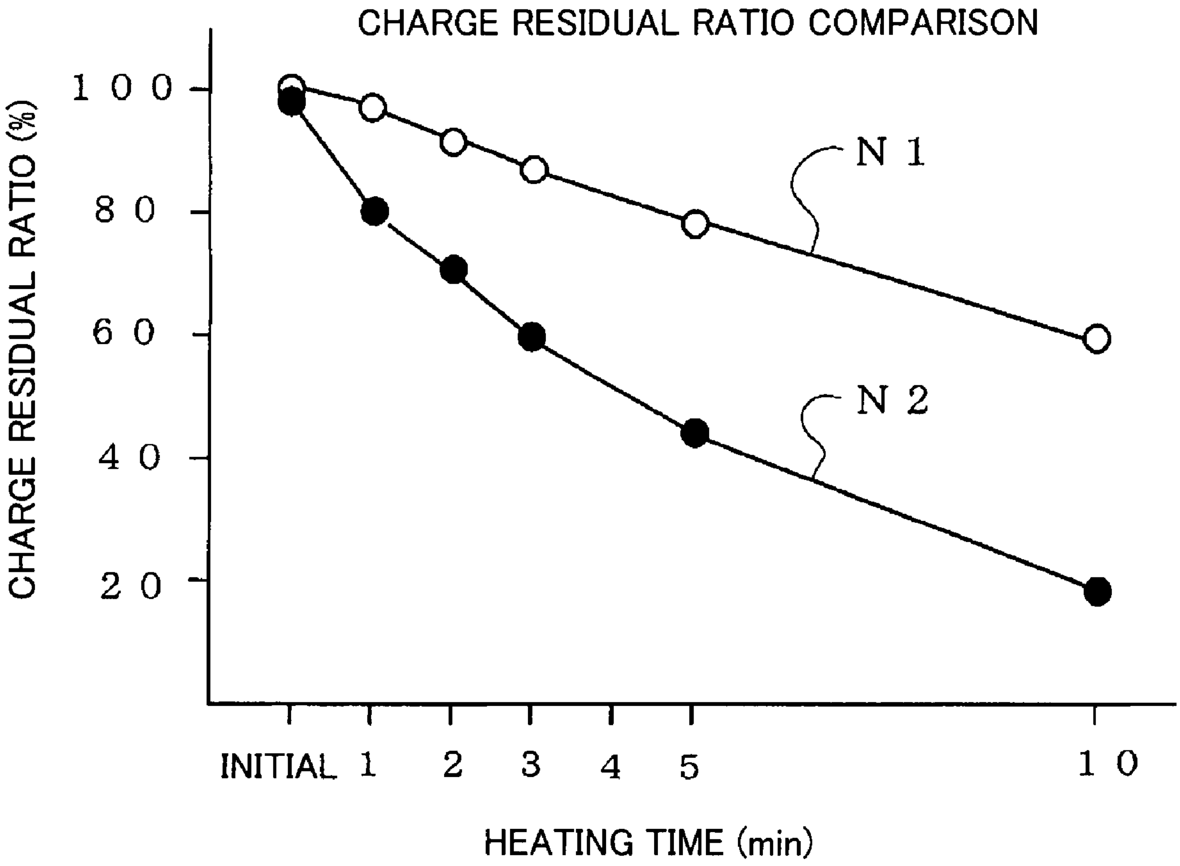
FIG. 5 is a graph showing heat-resistance characteristics of an adhesive-backed PTFE film used in the present invention and a PTFE film having no adhesive bonded thereto.

FIG. 5 is a graph showing heat-resistance characteristics of a sample $N_1$ of backplate substrate formed through the steps shown in FIG. 1, and a sample $N_2$ of backplate substrate formed by fixedly securing PTFE directly to a backplate through fusion bonding and implanting an electric charge thereinto. The charge residual ratio shown in FIG. 5 was calculated as follows. Each sample was placed on a hot plate at 250° C., and the surface potential was measured at each elapsed time. The charge residual ratio was calculated from the decrement of the surface potential. During the process of heating each sample with the hot plate, the charge residual ratio was measured at an interval of 1 minute from the initiation of the heating to a heating time of 5 minutes in view of the time period at which the electret layer is exposed to high temperature during reflow process, i.e. from 2 to 3 minutes. In addition, assuming more severe conditions, we measured the charge residual ratio when 10 minutes had elapsed from the initiation of the heating.

As shown in FIG. 5, the sample $N_2$ has a charge residual ratio decreasing as follows: 80% after elapse of 1 minute; 70% after elapse of 2 minutes; 45% after elapse of 5 minutes; and 20% after elapse of 10 minutes. In contrast, the sample $N_1$ has a charge residual ratio of 80% after elapse of 5 minutes and 65% even after elapse of 10 minutes. Thus, it will be understood that the backplate substrate prepared by the method according to the present invention has an excellent electric charge retaining effect.

Figure 6:
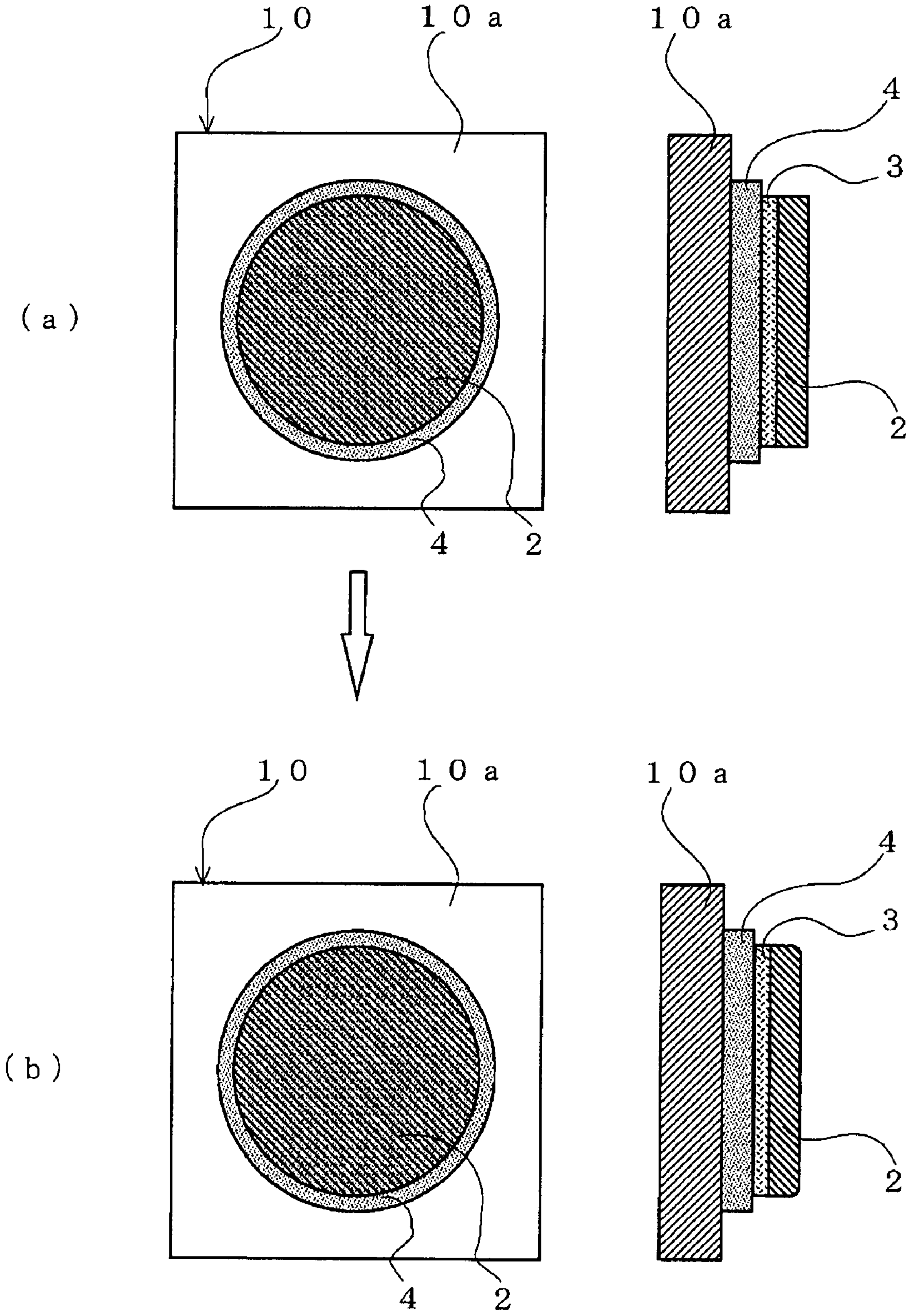
FIG. 6 is an illustration showing a backplate substrate using an acrylic adhesive, in which: the upper part (a) of the figure showing shows in a plan view and a sectional view a state of an adhesive-backed PTFE sheet before heat-treatment of the backplate; and lower part (b) of the figure shows in a plan view and a sectional view a state of the adhesive-backed PTFE material after the heat-treatment.
Figure 7:
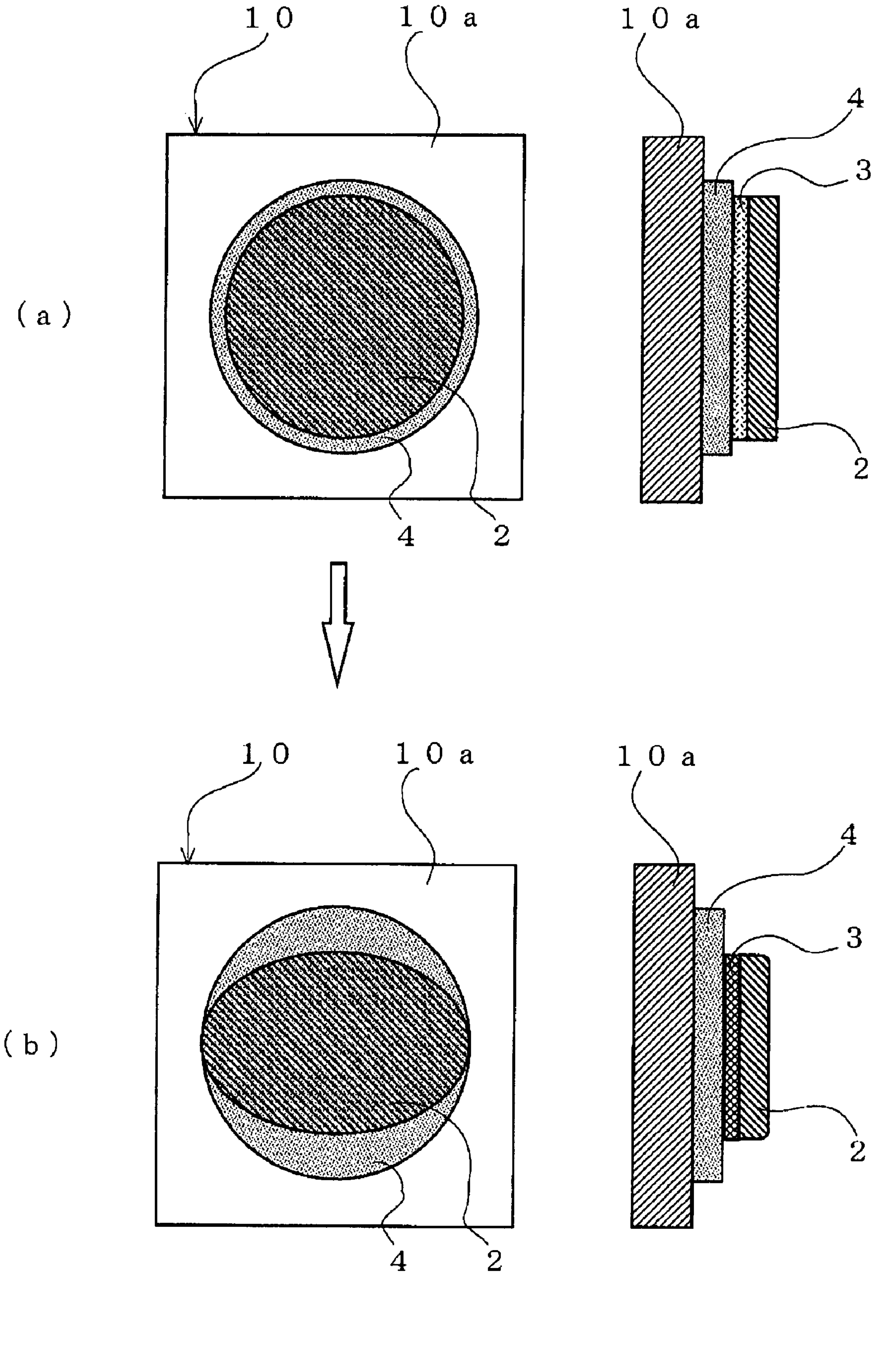
FIG. 7 is an illustration showing a backplate substrate using a pressure-sensitive rubber adhesive, in which: the upper part (a) shows in a plan view and a sectional view a state of an adhesive-backed PTFE material before heat treatment of the backplate; and the lower part (b) shows in a plan view and a sectional view a state of the adhesive-backed PTFE material after the heat-treatment.

FIGS. 6 and 7 show the backplate substrate 10 in plan and sectional views. In each of FIGS. 6 and 7, the upper-half part (a) shows the backplate substrate 10 when finished with step J4 in FIG. 1, and the lower-half part (b) shows the backplate substrate 10 when finished with the heat treatment at step J5 in FIG. 1. The backplate substrate 10 shown in FIG. 6 uses an acrylic adhesive as the adhesive 3. The backplate substrate 10 shown in FIG. 7 uses a rubber adhesive as the adhesive 3.

In the backplate substrate 10 using an acrylic adhesive as the adhesive 3, which is shown in FIG. 6, there is substantially no change in shape before [part (a) in the figure] and after [part (b) in the figure] the heat treatment. That is, the circular shape of the PTFE 2 is maintained as it is. In the backplate substrate 10 using a rubber adhesive as the adhesive 3, which is shown in FIG. 7, the adhesive 3 shrinks extremely after the heat treatment, as shown in part (b), as compared to the state before the heat treatment, shown in part (a). That is, the circular PTFE 2 is deformed into an oval shape.

The backplate substrate 10 using an acrylic adhesive as the adhesive 3, which is shown in FIG. 6, has substantially no change in shape after the heat treatment. That is, the backplate substrate 10 exhibits a superior shape retaining effect. Thus, the effect of the adhesive 3 to suppress the molecular motion of the PTFE 2 is great. Accordingly, it is possible to obtain a backplate substrate 10 exhibiting a high charge residual ratio. In the backplate substrate 10 using a rubber adhesive as the adhesive 3, which is shown in FIG. 7, the shape retaining effect in the heat treatment is inferior. Therefore, the effect of the adhesive 3 to suppress the molecular motion of the PTFE 2 is weak. Accordingly, a backplate substrate 10 of high charge residual ratio cannot be obtained.

It has been confirmed that when a silicone adhesive is used as the adhesive 3, it is also possible to obtain the same shape retaining effect as that obtained when an acrylic adhesive is used.

The following is an explanation of the results of comparison in terms of electric charge retaining characteristics against heating in the reflow oven between the backplate substrate 10 using the adhesive-backed PTFE according to the present invention and a commercially available backplate substrate.

Figure 8:
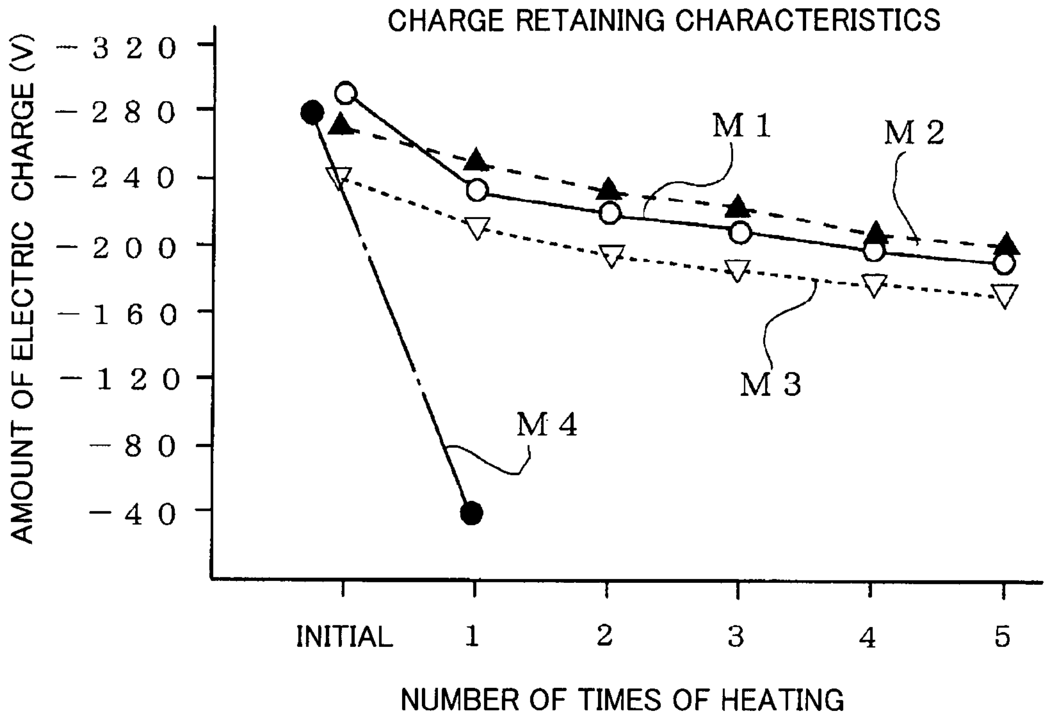
FIG. 8 is a graph of electric charge retaining characteristics of backplate substrates, showing the relationship of the decay of electric charge to heating.

FIG. 8 is a graph of electric charge retaining characteristics of each of the backplate substrates, showing the relationship of the electric charge decay to heating in the reflow oven. The abscissa axis represents the number of times of repeated heating in the reflow oven. The ordinate axis represents the amount of electric charge measured after each heating. That is, each backplate substrate having its electret layer charged to −300 V was heated in the reflow oven at a temperature of 160° C. to 180° C. for about 100 seconds and thereafter at 250° C. for about 10 seconds. Thereafter, the amount of electric charge was measured. The measurement was repeated 5 times to obtain data on the electric charge retaining characteristics.

The sample $M_1$ is the backplate substrate 10 prepared by the method according to the present invention. The samples $M_2$ and $M_3$ are the backplate substrates of commercially available electret condenser microphones. $M_2$ and $M_3$ have a laminated structure using PTFE film similar to that of $M_1$. The sample $M_2$, in particular, is a heat-resistant backplate substrate. $M_4$ is a non-heat resistant backplate substrate using an FEP laminate, which is shown for the purpose of comparison.

It can be seen from the comparison results that in the samples $M_1$, $M_2$ and $M_3$, which use PTFE as an electret layer, the electric charge gradually decays with the number of times of heating from the initial value of −300 V and becomes stabilized in the neighborhood of −200 V, whereas the sample $M_4$, which uses FEP as an electret layer, loses almost all the implanted electric charge by the first heating.

That is, the samples using PTFE as an electret layer are basically capable of withstanding reflow soldering temperatures because PTFE is heat resistant. Among them, the backplate substrate $M_1$ according to the present invention has higher electric charge retaining characteristics than the backplate substrate $M_3$ having a conventional PTFE laminate structure and is close in electric charge retaining characteristics to the heat-resistant backplate substrate $M_2$.

In other words, the present invention achieves a backplate substrate having heat-resistance characteristics equal to those of the heat-resistant backplate substrate $M_2$, which has been subjected to special heat-resistance treatment, despite a simple production method in which a PTFE sheet subjected to surface activation treatment and integrated with an adhesive is die-cut into each individual piece of PTFE, and this is bonded to a backplate and heat-treated.

Figure 9:
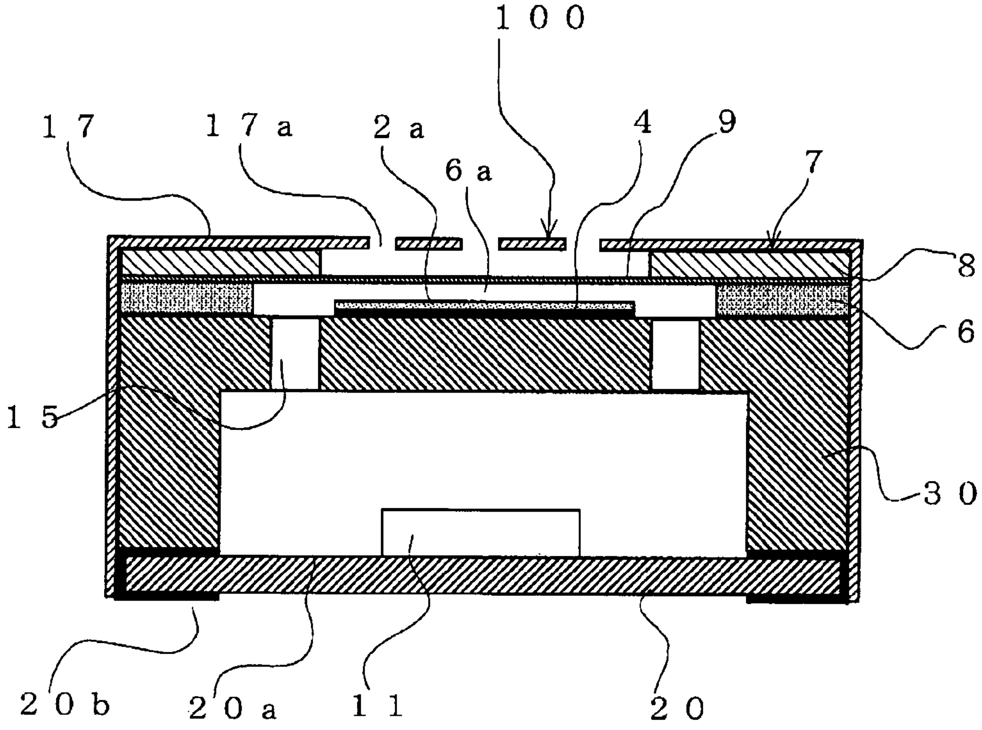
FIG. 9 is a sectional view of an ECM using a backplate substrate as a vibration detecting device, which illustrates a second embodiment of the present invention.
Figure 10:
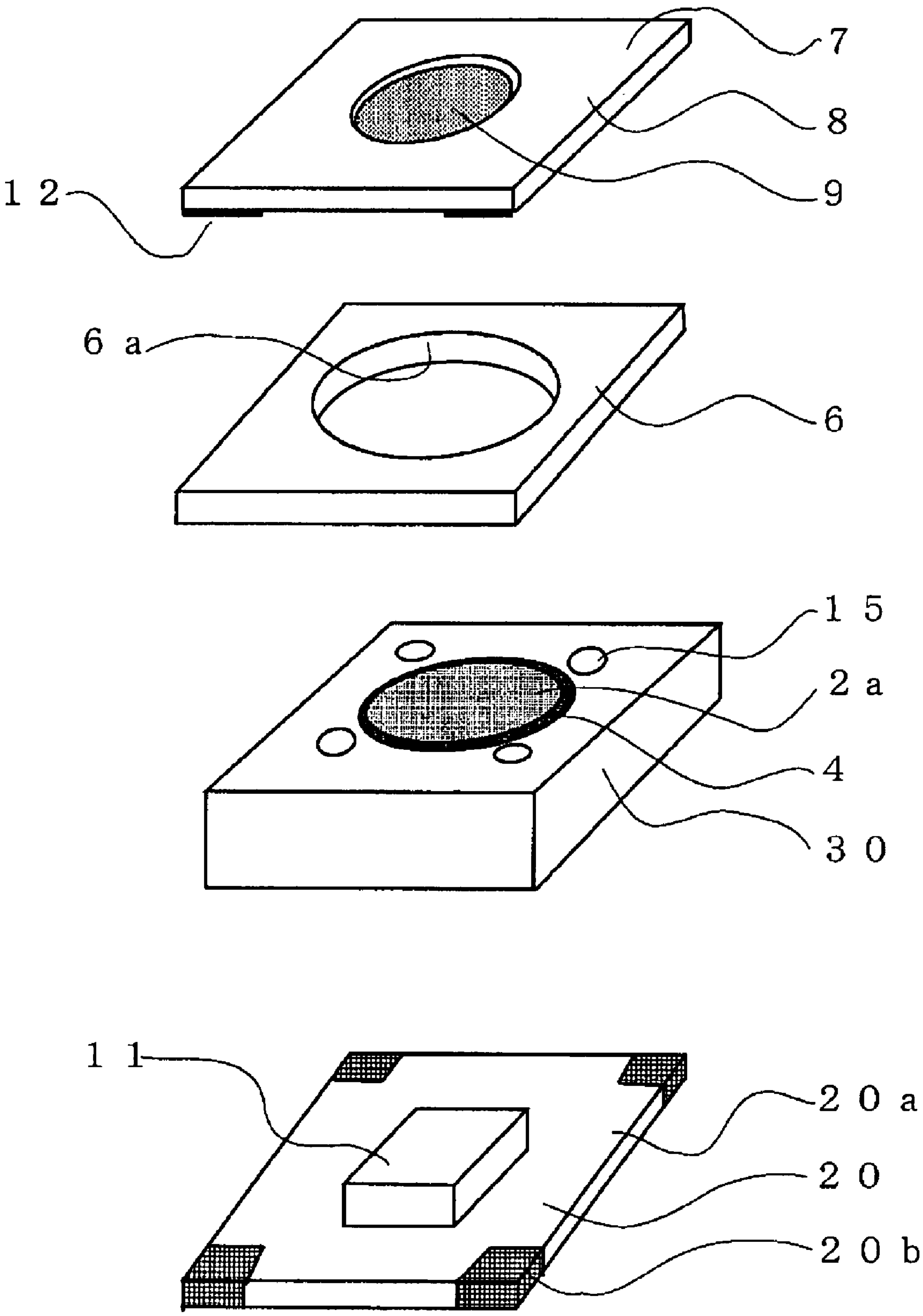
FIG. 10 is an exploded perspective view of elements constituting the ECM shown in FIG. 9.

The following is an explanation of an electret condenser microphone (hereinafter abbreviated as "ECM"), which is a product using the backplate substrate 10. FIG. 9 is a sectional view of an ECM using the backplate substrate 30 according to the present invention as a vibration detecting device. FIG. 10 is an exploded perspective view of each element constituting the ECM shown in FIG. 9.

In FIG. 9, a circuit board 20 comprises an insulating substrate 20*a* on which terminals 20*b* for connection and output are film-formed. In addition, an integrated circuit 11 as an electronic component is mounted on the insulating substrate 20*a*. A backplate substrate 30 corresponds to the backplate substrate 10 shown in FIG. 4. The backplate substrate 30 has a backplate 4 made of an electrically conductive film on the upper side thereof. The PTFE 2 shaped at step J3 in FIG. 1 is firmly secured to the upper side of the backplate 4 to form an electret layer 2*a*. In addition, through-holes 15 are provided in the backplate substrate 30. A spacer 6 has an opening 6*a*. A diaphragm unit 7 includes a diaphragm support frame 8 having an electrically conductive diaphragm 9 fixedly secured to the lower side thereof.

As shown in FIG. 10, the above-described constituent elements, i.e. the circuit board 20, the backplate substrate 30, the spacer 6, and the diaphragm unit 7, are stacked with an adhesive interposed between each pair of adjacent elements, and a metal casing 17 serving as both electrical connection and shield is provided to cover the outer periphery of the stack of the constituent elements, thereby completing an ECM 100. To mount the completed ECM 100 into a portable cellular phone or other device, the output terminals 20*b* of the ECM 100 are soldered to wiring electrodes formed on a motherboard of the device in a reflow oven at about 160° C. to 180° C. for about 100 seconds, followed by high-temperature processing at 250° C. for about 10 seconds. Despite the high-temperature processing, there is a minimal degradation of the electric charge implanted in the electret layer 2*a*, which is made of the adhesive-backed PTFE. Accordingly, the ECM 100 can function as desired without any problem.

In the ECM 100 having the above-described structure, the diaphragm 9 having an electrically conductive film on the surface thereof and the backplate 4 having the electret layer 2*a* formed on the surface thereof are opposed to each other to form a capacitor, thereby constituting a vibration detecting device. When the diaphragm 9 vibrates, the capacitor converts the vibration of the diaphragm 9 into an electric signal. The electric signal is led to the circuit board 20 and processed in the integrated circuit 11 before being output from the output terminals 20*b* provided on the circuit board 20. The through-holes 15 enable the diaphragm 9 to vibrate smoothly.

Next, a method suitable for mass-producing the ECM 100 will be explained with reference to FIGS. 11 to 13.

Figure 11:
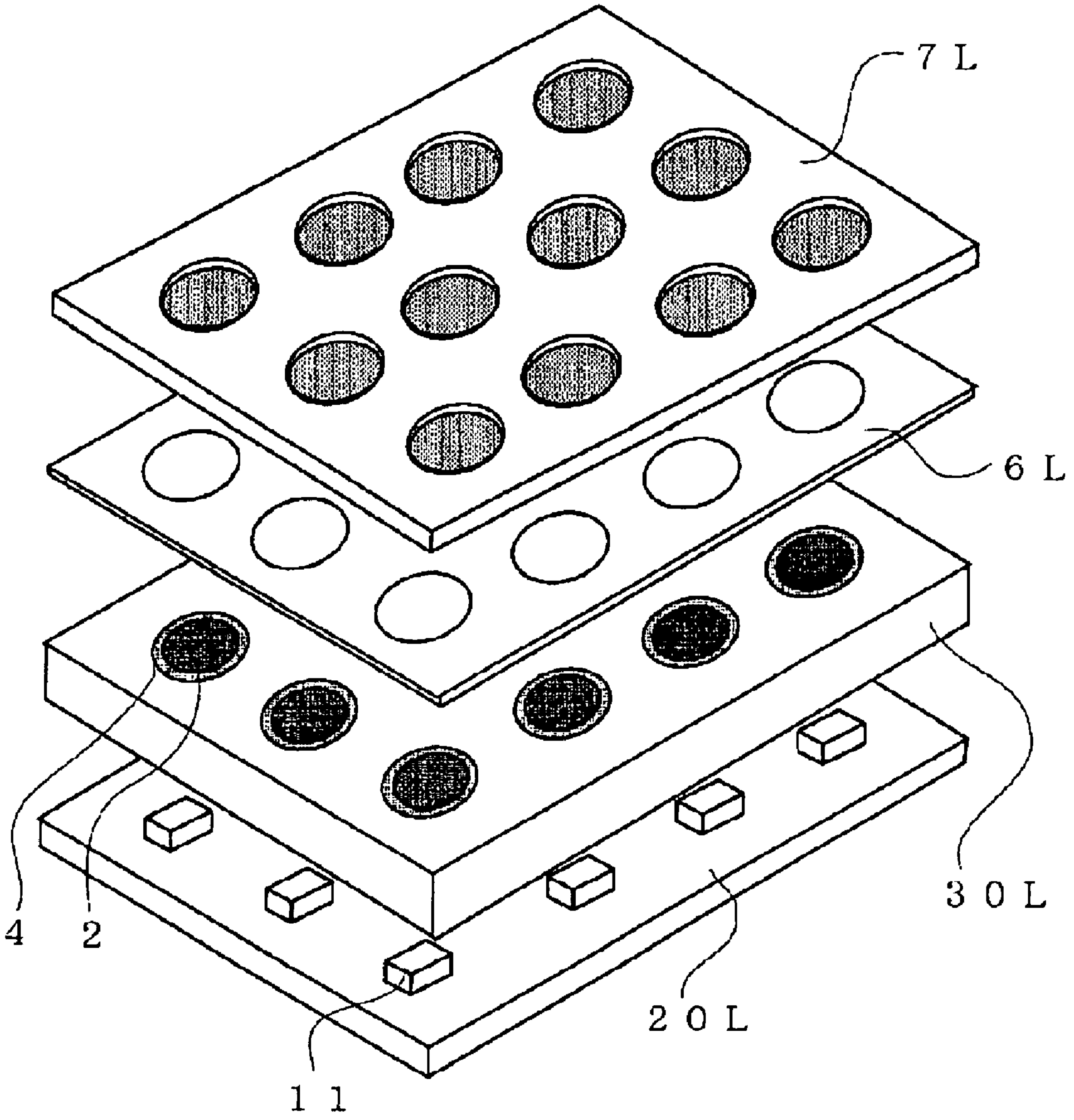
FIG. 11 is a perspective view of component aggregations used in the process of producing an ECM aggregation, which illustrates a third embodiment of the present invention.

FIG. 11 shows materials used in the production method, i.e. a diaphragm unit aggregation 7L, a spacer aggregation 6L, a backplate substrate aggregation 30L, and a circuit board aggregation 20L.

The diaphragm unit aggregation 7L is an aggregation including a multiplicity of portions each corresponding to the diaphragm unit 7 in FIG. 10 that are arrayed in a lattice. Similarly, the spacer aggregation 6L is an aggregation including a multiplicity of portions each corresponding to the spacer 6 in FIG. 10 that are arrayed in a lattice.

The backplate substrate aggregation 30L is an aggregation including a multiplicity of portions each corresponding to the backplate substrate 30 in FIG. 10 that are arrayed in a lattice. Each of the portions of the backplate substrate aggregation 30L has a backplate 4 and an electret layer 2*a*. The electret layer 2*a* is formed through the steps J1 to J6 in FIG. 1. The circuit board aggregation 20L is a large-sized substrate including a multiplicity of portions each corresponding to the circuit board 20 in FIG. 10 that are arrayed in a lattice. An integrated circuit 11 is mounted on each of the portions of the circuit board aggregation 20L. It should be noted that each aggregation is provided with electrode patterns, through-holes for communication between components and for sound release, etc.

In production of ECMs, the circuit board aggregation 20L, the backplate substrate aggregation 30L, the spacer aggregation 6L and the diaphragm unit aggregation 7L are stacked in the order shown in FIG. 11 and bonded together. The bonding may be effected by applying an adhesive to the surface of each aggregation. Alternatively, an adhesive sheet may be interposed between each pair of adjacent aggregations and heated to bond the aggregations. An adhesive sheet without holes having an outline shape similar to that of the spacer aggregation 6L in FIG. 11 should preferably be used, although not shown in the figure.

Figure 12:
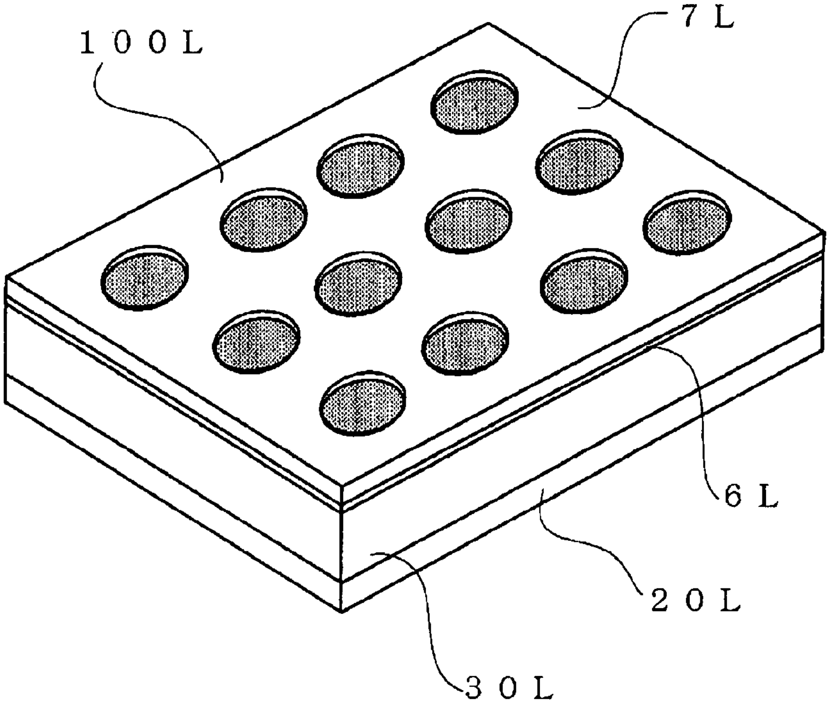
FIG. 12 is a perspective view showing the finished form of an ECM aggregation according to the present invention.
Figure 13A:
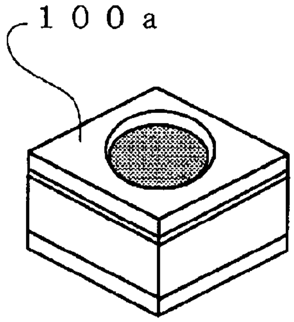
FIGS. 13*a* and 13*b* are perspective views showing the finished form of an individual ECM according to the present invention.
Figure 13B:
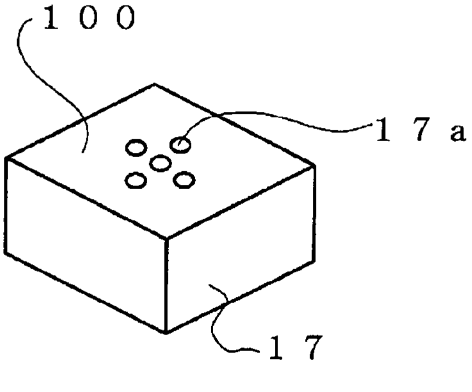

As the result of the above-described step, an ECM aggregation 100L is obtained, which is a stack of the above-described aggregations 20L, 30L, 6L, 7L as shown in FIG. 12. The ECM aggregation 100L has a multiplicity of ECMs 100 integrally arrayed in a matrix. The ECM aggregation 100L is stuck to an adhesive sheet for fixing and diced with a cutter along dividing lines between the adjacent ECMs 100, thereby forming each individual ECM 100*a*, as shown in FIG. 13*a*. The ECM 100*a* is covered with the metal casing 17 to complete an ECM 100, as shown in FIG. 13*b*. Although FIGS. 11 and 12 illustrate an ECM aggregation 100L having 12 ECMs arrayed in a matrix of 3 rows and 4 columns, in actuality a single ECM aggregation preferably includes several hundreds of ECMs from the viewpoint of mass-production.

Next, the production steps of the method of mass-producing the ECM 100 according to the present invention will be explained with reference to FIG. 14.

Figure 14:
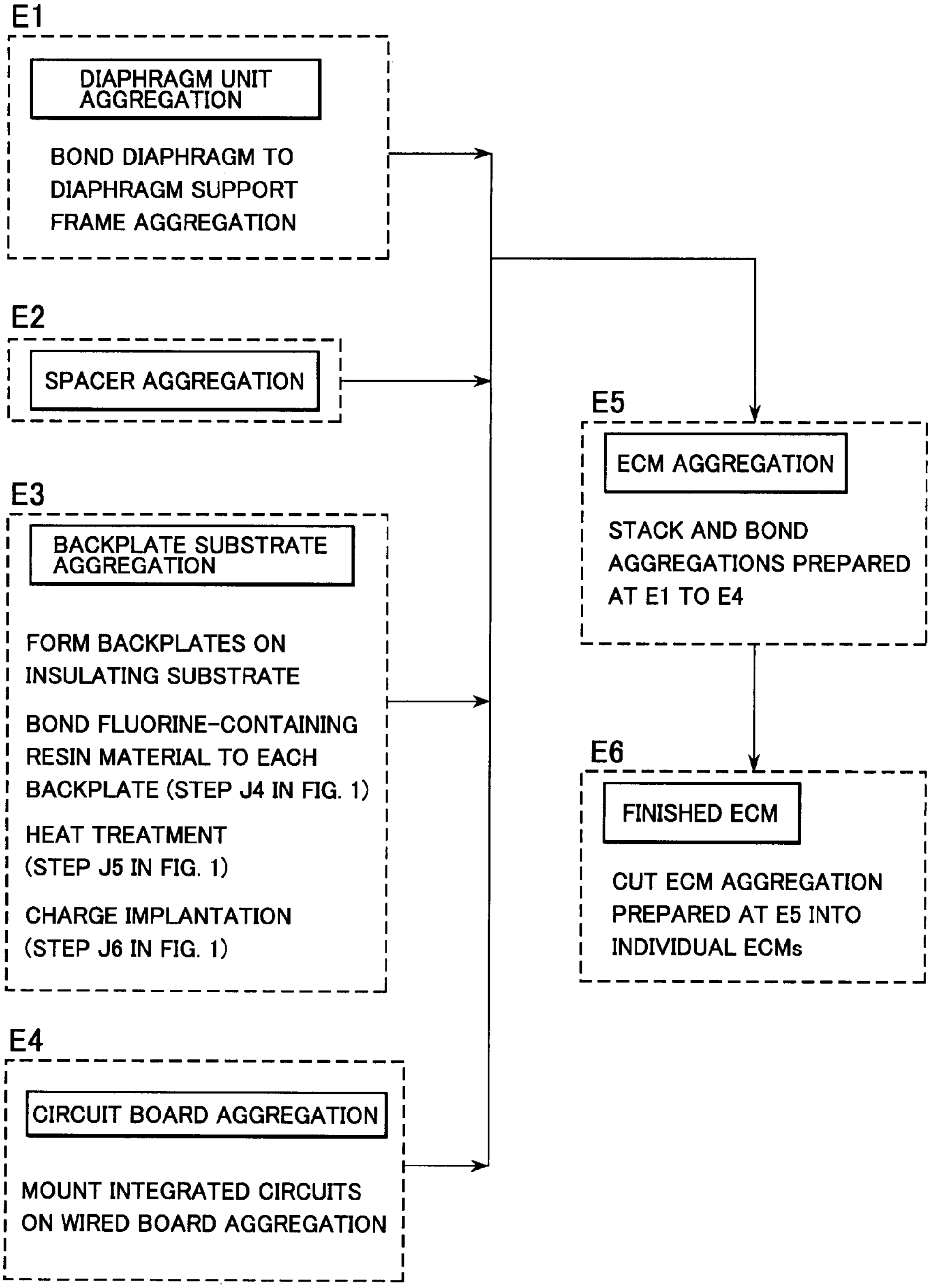
FIG. 14 is a process flow chart showing a method of producing the ECM aggregation according to the third embodiment of the present invention.

In FIG. 14, step E1 is a step of producing a diaphragm unit aggregation 7L, in which an electrically conductive diaphragm is integrally bonded to a diaphragm support frame aggregation made of an insulating material. Step E2 is a step of producing a spacer aggregation 6L, in which a plurality of openings are formed in a spacer aggregation.

Step E3 is a step of producing a backplate substrate aggregation 30L, in which, as shown in FIG. 11, a plurality of backplates 4 are disposed on an insulating substrate, and a shaped PTFE 2 is stacked on each backplate 4, thereby forming a backplate substrate aggregation 30L. Each PTFE 2 is an adhesive-backed fluorine-containing resin material 1*a* shaped as shown in FIG. 3.

Further, the backplate substrate aggregation 30L is loaded into charge implantation equipment in which an electric charge is implanted into each PTFE 2 to form an electret layer, thereby completing a heat-resistant backplate substrate aggregation 30L.

It should be noted that the process in step E3 for stacking PTFEs 2 onto a plurality of backplates 4 on the insulating substrate aggregation may be performed by a method wherein each PTFE 2 shaped as stated above is bonded with visual alignment or by using an alignment jig. It is also possible to employ a method wherein a sheet of adhesive-backed fluorine-containing resin material 1, which is shown in FIG. 2, is stacked over the entire surface of the insulating substrate aggregation, and a portion of the adhesive-backed fluorine-containing resin sheet 1 corresponding to each backplate 4 is shaped by using the cutting die 200 as shown in FIG. 3.

Step E4 is a step of producing a circuit board aggregation 20L, in which electric elements such as integrated circuits are mounted on a wired board aggregation having wiring, connection terminals, etc. to form the circuit board aggregation 20L. Step E5 is a step of producing an ECM aggregation 100L, in which the aggregation elements produced in the above-described steps E1 to E4 are stacked and bonded together with an adhesive to form the ECM aggregation 100L as shown in FIG. 12. Step E6 is a step of producing a finished ECM, in which the ECM aggregation 100L produced in step E5 is cut into pieces to complete the ECM 100 as shown in FIG. 13.

Thus, according to the present invention, a fluorine-containing resin material subjected to surface activation treatment and an adhesive are stacked and bonded together to form an adhesive-backed fluorine-containing resin sheet, and this is shaped and bonded to each backplate. This production process is particularly suitable for ECM production using a large-sized substrate for the backplate substrate aggregation.

Next, a backplate substrate production method according to a fourth embodiment of the present invention will be explained with reference to FIG. 15.

Figure 15:
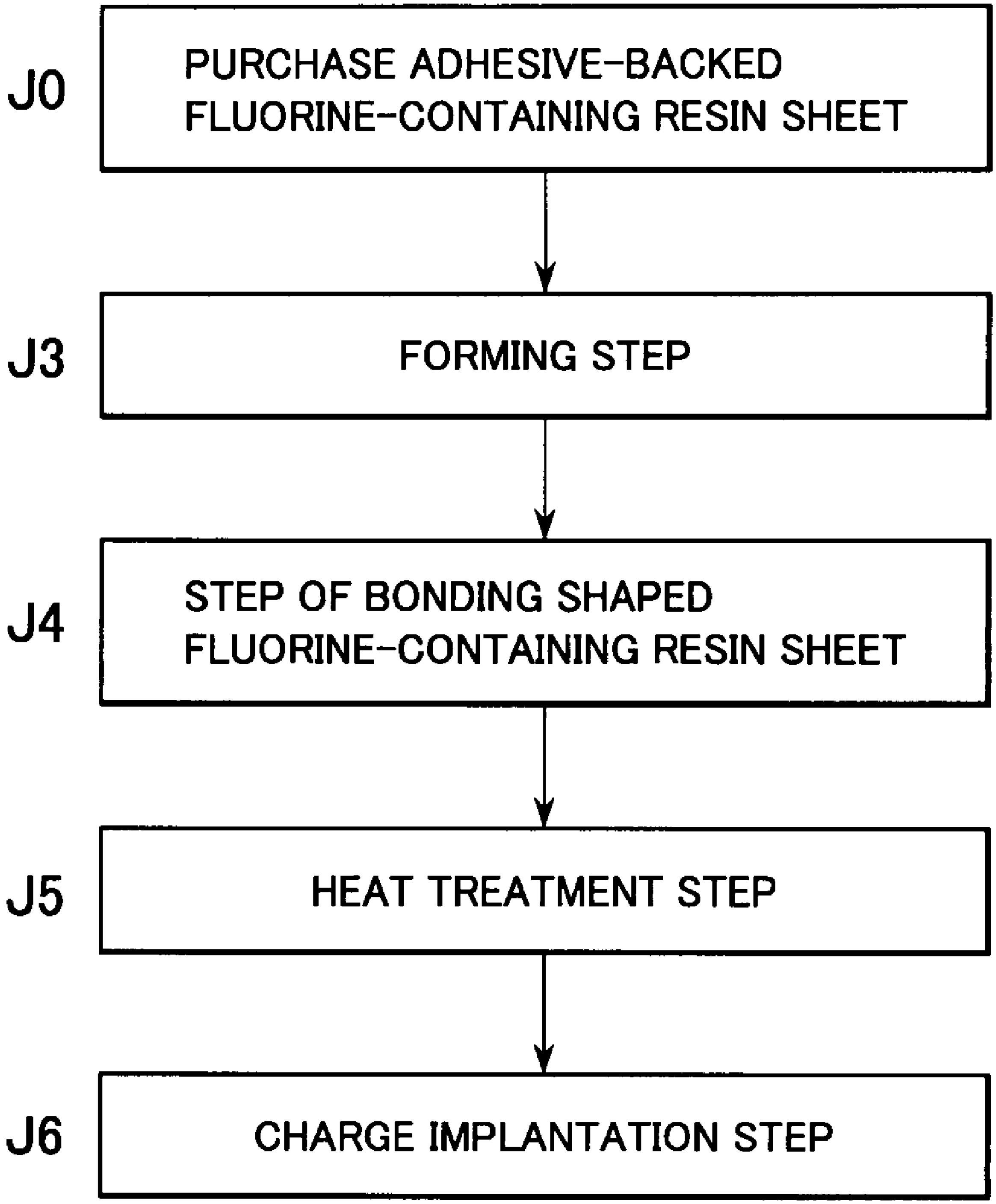
FIG. 15 is a process flow chart showing a method of producing a backplate substrate, which illustrates a fourth embodiment of the present invention.

FIG. 15 is a process flow chart showing a backplate substrate production method using PTFE according to the present invention. In FIG. 15, the same steps as those shown in FIG. 1 are denoted by the same reference symbols, and a redundant description thereof is omitted.

The process shown in FIG. 15 differs from that of FIG. 1 in that the step J1 of surface treatment and the step J2 of integrating an adhesive and the fluorine-containing resin sheet surface-treated at step J1 in FIG. 1 are replaced with the step J0 of purchasing a commercially available adhesive-backed fluorine-containing resin sheet as shown in FIG. 15.

It should be noted that the present invention is not necessarily limited to the foregoing embodiments but can be modified in a variety of ways without departing from the gist of the present invention. For example, although the foregoing embodiments employ as an ECM structure a backplate structure having detecting terminates provided on the back side, it is also possible to employ an electrode structure having detecting terminals provided on the front side. Further, although wet chemical etching has been shown as chemical etching, it is also possible to employ dry chemical etching such as corona treatment or oxygen plasma treatment.

What is claimed is:

1. A method of producing an electret condenser microphone, the method comprising:

a first step of forming an adhesive-backed fluorine-containing resin film by stacking an adhesive on a film-shaped fluorine-containing resin material, and then, processing the adhesive-backed fluorine-containing resin film to a shape of a backplate;

a second step of stacking the adhesive-backed fluorine-containing resin film on the backplate made of an electrically conductive film and provided on a backplate substrate, the backplate with the adhesive interposed between the backplate and the fluorine-containing resin film;

a third step of thermo-setting the adhesive to firmly secure the fluorine-containing resin film to the backplate of the backplate substrate; and a fourth step of implanting electric charges into the fluorine-containing resin film firmly secured onto the backplate.

2. The method of claim 1, wherein the fluorine-containing resin material is one selected from the group consisting of polytetrafluoroethylene, tetrafluoroethylene-hexafluoropropylene copolymer, and tetrafluoroethylene-perfluoroalkyl vinyl ether copolymer.

3. The method of claim 1, wherein the first step includes a step of etching a surface of the film-shaped fluorine-containing resin material by wet or dry chemical etching before stacking the adhesive on the film-shaped fluorine-containing resin material.

4. The method of claim 3, wherein the etching is wet chemical etching in which the film-shaped fluorine-containing resin material is dipped in a solution containing ions of an alkaline metal.

5. The method of claim 4, wherein the alkaline metal is one selected among lithium, sodium, and potassium.

6. The method of claim 4, wherein the solution containing ions of the alkaline metal is a solution containing any one of ammonia, naphthalene, and phenanthrene.

7. The method of claim 1, wherein the adhesive is an organic polymeric adhesive.

8. The method of claim 1, wherein the adhesive is an acrylic or silicone adhesive.

9. The method of claim 1, wherein the third step includes a step of setting adhesive by heating it at a temperature of from 180° C. to 250° C.

10. The method of claim 1, wherein the third step includes a step of setting the adhesive by heating it at a temperature of from 210° C. to 235° C.

* * * * *